United States Patent
Zheng et al.

(10) Patent No.: US 12,491,578 B2
(45) Date of Patent: Dec. 9, 2025

(54) PLASMA ARC-LASER HYBRID WELDING METHOD FOR HIGH-SEALING ALUMINUM ALLOY RECTANGULAR CHAMBER

(71) Applicant: SHENYANG FORTUNE PRECISION EQUIPMENT CO., LTD., Liaoning (CN)

(72) Inventors: Guangwen Zheng, Liaoning (CN); Yongpeng Qiao, Liaoning (CN); Dongjiang Wu, Liaoning (CN); Fangyong Niu, Liaoning (CN); Guangyi Ma, Liaoning (CN)

(73) Assignee: SHENYANG FORTUNE PRECISION EQUIPMENT CO., LTD., Liaoning (CN)

( * ) Notice: Subject to any disclaimer, the term of this patent is extended or adjusted under 35 U.S.C. 154(b) by 898 days.

(21) Appl. No.: 17/772,109

(22) PCT Filed: Jan. 13, 2020

(86) PCT No.: PCT/CN2020/071776
§ 371 (c)(1),
(2) Date: Apr. 26, 2022

(87) PCT Pub. No.: WO2021/114456
PCT Pub. Date: Jun. 17, 2021

(65) Prior Publication Data
US 2022/0371125 A1    Nov. 24, 2022

(30) Foreign Application Priority Data
Dec. 10, 2019   (CN) .......................... 201911255271.0

(51) Int. Cl.
*B23K 26/348*   (2014.01)
*B23K 103/10*   (2006.01)

(52) U.S. Cl.
CPC ........ *B23K 26/348* (2015.10); *B23K 2103/10* (2018.08)

(58) Field of Classification Search
CPC .......................... B23K 2103/10; B23K 26/348
(Continued)

(56) References Cited

U.S. PATENT DOCUMENTS

| | | | |
|---|---|---|---|
| 6,388,227 B1 * | 5/2002 | Dykhno | B23K 26/348 219/121.45 |
| 7,044,326 B2 * | 5/2006 | Martin | B65D 7/06 220/676 |

FOREIGN PATENT DOCUMENTS

| | | |
|---|---|---|
| CN | 104191092 A | 12/2014 |
| CN | 104475977 A | 4/2015 |

(Continued)

OTHER PUBLICATIONS

Hu Xu et al, Piperidinium functionalized aryl ether-free polyaromatics as anion exchange membrane for water electrolyses: performance and durability, Journal of Membrane Science, Dec. 19, 2020, vol. 621, pp. 1-12.

(Continued)

*Primary Examiner* — Jimmy Chou

(57) ABSTRACT

A plasma arc-laser hybrid welding method for a high-sealing aluminum alloy thick plate rectangular chamber is provided. A length, height and width of the rectangular chamber of the high-sealing aluminum alloy thick plate are all ≥350 mm. The aluminum alloy tensile plate material for the chamber is AL6061-T6, the plate thickness is 20 mm-25 mm, and the adjacent plates are in accordance with T The welding wire material is 4043, the diameter of the welding wire is φ1.2 mm, the height and width of the welding seam are required to be greater than 5 mm, the welding seam quality meets GB\12469-1990, and the ultimate vacuum degree of the chamber reaches 1 Pa. It greatly improves the material (Continued)

utilization rate and processing efficiency, and reduces the material and cycle cost. Using hybrid welding technology, compared with single laser welding and plasma welding, the welding quality is effectively improved.

3 Claims, 1 Drawing Sheet

(58) Field of Classification Search
USPC .................................................. 219/121.46
See application file for complete search history.

(56) References Cited

FOREIGN PATENT DOCUMENTS

| | | | | |
|---|---|---|---|---|
| CN | 105458469 A | * | 4/2016 | ............. B23K 9/167 |
| CN | 109128508 A | | 1/2019 | |
| CN | 110091066 A | | 8/2019 | |
| JP | 5881575 A | | 5/1983 | |
| JP | 2019198885 A | | 11/2019 | |

OTHER PUBLICATIONS

Li ZiQin et al, A Microporous Polymer With Suspended Cations for Anion Exchange Membrane Fuel Cells, Macromolecules, Sep. 12, 2020, vol. 53, pp. 10998-11008.

* cited by examiner

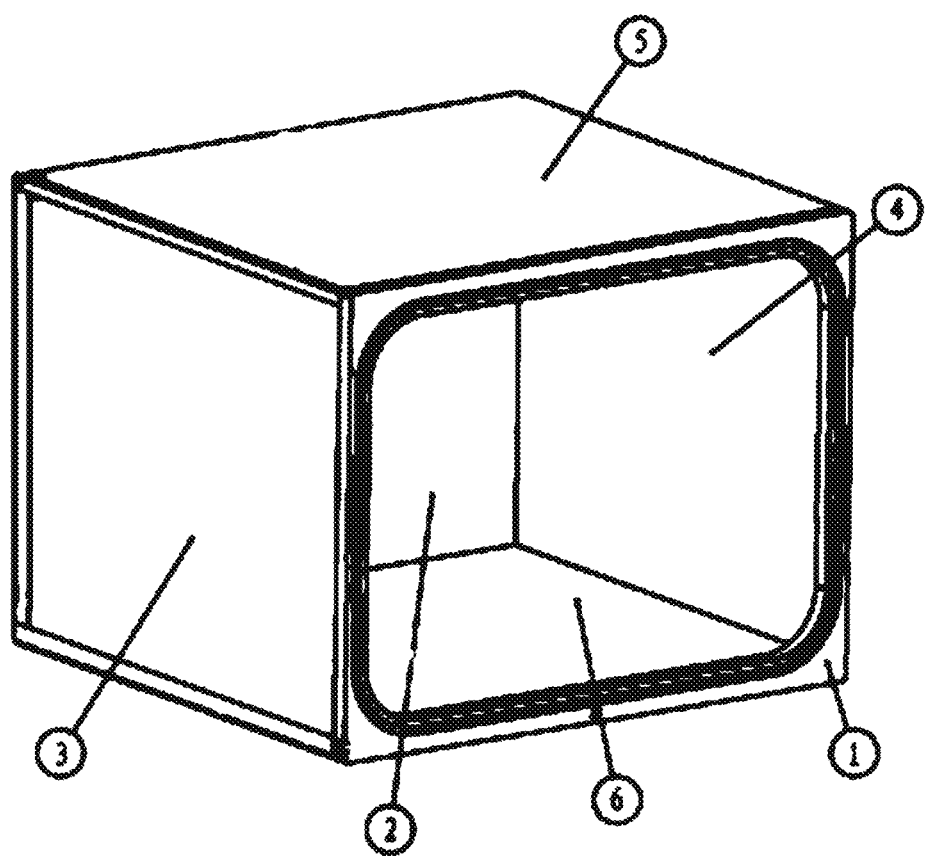

PLASMA ARC-LASER HYBRID WELDING METHOD FOR HIGH-SEALING ALUMINUM ALLOY RECTANGULAR CHAMBER

CROSS REFERENCE OF RELATED APPLICATION

This is a U.S. National Stage under 35 U.S.C 371 of the International Application PCT/CN2020/071776, filed Jan. 13, 2020, which claims priority under 35 U.S.C. 119(a-d) to CN 201911255271.0, filed Dec. 10, 2019.

BACKGROUND OF THE PRESENT INVENTION

Field of Invention

The invention belongs to the advanced forming and process in the field of advanced manufacturing technology, and more particularly to a plasma arc-laser hybrid welding method for a high-sealing aluminum alloy rectangular chamber.

Description of Related Arts

Aluminum alloys have the advantages of light weight, corrosion resistance, high strength, easy forming and no low temperature brittleness, and have been widely used in aerospace, high-speed rail, automobiles, electronic information and other fields. In these application fields, high-sealing aluminum alloy rectangular chamber is an important and typical engineering structure, such as CM welding loading chamber in IC equipment, medical aluminum alloy chamber, ultra-high vacuum system chamber for surface analysis body and chamber for vacuum coating, etc. These structures generally require high leak-tightness, strength and machining accuracy, and currently available machining methods include integral machining and welding forming. The overall machining method refers to the use of mechanical cutting to hollow out the whole aluminum alloy castings and forgings to realize the manufacture of the chamber. This method is complicated in process, and it is necessary to provide castings and forgings suitable for the product size first, and the machining cycle is long, the material utilization rate is extremely low, and it is not suitable for large-scale and low-cost manufacture of chamber structures. The welding forming method refers to adding the standard aluminum alloy sheet to the required size, and then welding the sheets together to form a chamber by welding. Conventional aluminum alloy welding methods include arc welding, laser welding, gas welding, flame welding, plasma welding or hybrid welding. For aluminum alloy sheets with a thickness of more than 20 mm in this application, the energy density of gas welding, flame welding, etc. is too small, and is not suitable for welding of thick sheets.

SUMMARY OF THE PRESENT INVENTION

The invention provides a high-sealing aluminum alloy rectangular chamber plasma arc-laser composite welding method. By reasonably designing welding sequence and setting welding process parameters, a rectangular chamber of aluminum alloy thick plate with high precision, low deformation and good sealing can be realized. body welding.

The concrete technical scheme of the present invention is as follows.

A plasma arc-laser hybrid welding method for a high-sealing aluminum alloy rectangular chamber, comprising steps of:

step (1): first clamping and assembling a No. 1 plate, a No. 3 plate, a No. 4 plate, a No. 5 plate, and a No. 6 plate into a rectangular chamber, retaining a No. 2 plate for the time being, and temporarily installing the No. 2 plate in the chamber; using predetermined welding process parameters to weld four internal welding seams of the No. 1 plate to the No. 3 plate, the No. 4 plate, the No. 5 plate and No. 6 plate;

step (2): keeping a posture of the chamber unchanged, covering the No. 2 plate, and using the optimized welding process parameters to weld two external welding seams of the No. 2 plate to the No. 5 plate and the No. 6 plate;

step (3): turning the chamber upside down to place the No. 2 plate at the bottom, so that the No. 2 plate is overlapped with the No. 3 plate, the No. 4 plate, the No. 5 plate, and No. 6 plate, and four internal welding seams of the No. 2 plate are all in a horizontal state; using the predetermined welding process parameters to weld four internal welding seams of the No. 2 plate to the No. 3, No. 4, No. 5 and No. 6 plates;

step (4): adjusting the chamber to a posture where the No. 6 plate is placed at the bottom, and using the predetermined welding process parameters to weld two internal welding seams of the No. 6 plate to the No. 3 and No. 4 plates;

step (5): adjusting the chamber to a posture where the No. 5 plate is placed at the bottom, and using the predetermined welding process parameters to weld two internal welding seams of the No. 5 plate to the No. 3 plate and the No. 4 plate, as well as one external welding seam of the No. 1 plate to the No. 6 plate;

step (6): adjusting the chamber to a posture where the No. 6 plate is placed at the bottom, and using the predetermined welding process parameters to weld one welding seam of the No. 1 plate to the No. 5 plate;

step (7): adjusting the chamber to a posture where the No. 3 plate is placed at the bottom, and using the predetermined welding process parameters to weld four external welding seams of the No. 4 plate to the No. 1 plate, the No. 2 plate, the No. 5 plate and the No. 6 plate; and step (8): adjusting the chamber to a posture where the No. 4 plate is placed at the bottom, and using the predetermined welding process parameters to weld four external welding seams of the No. 3 plate to the No. 1 plate, the No. 2 plate, the No. 5 plate and the No. 6 plate.

The advantage of the invention is that the aluminum alloy drawing plate is used for tailor welding to form the chamber instead of machining the aluminum alloy casting or forging, which greatly improves the material utilization rate and processing efficiency, and reduces the material and cycle cost. Using hybrid welding technology, compared with single laser welding and plasma welding, the welding quality is effectively improved. In addition, the composite welding process is more conducive to ensuring the consistency of welding quality, and provides a reliable choice for the welding forming of high-quality aluminum alloy thick plate rectangular chamber structure.

BRIEF DESCRIPTION OF THE DRAWINGS

FIG. 1 is a schematic diagram of a rectangular chamber made of a high-sealing aluminum alloy thick plate.

DETAILED DESCRIPTION OF THE PREFERRED EMBODIMENT

The present invention will be further described below with reference to FIG. 1 and the embodiments.

Aluminum alloy thick plate rectangular chamber structure, the length, height and width of the high sealing aluminum alloy thick plate rectangular chamber are all ≥350 mm, the aluminum alloy tensile plate material for the chamber is AL6061-T6, the plate thickness is 20 mm-25 mm, preferably 20 mm, the adjacent plates are spliced according to the positioning method between the T-shaped or L-shaped plates, the welding wire material is 4043, the welding wire diameter is φ1.2 mm, the height and width of the welding seam are required to be greater than 5 mm, and the welding seam quality It meets the GB\12469-1990 defect level 1 standard, and the ultimate vacuum degree of the chamber reaches 1 Pa.

The equipment used for welding is robotic automatic welding equipment, mainly including multi-joint robots, plasma arc welding machines, lasers and two-axis positioners. 99.99% high-purity argon gas is used as the shielding gas, and the shielding gas flow rate is set to 20 L/min.

The method for automatic MIG welding of aluminum alloy thick plate chamber with high sealing performance is characterized in that: in the welding process, high-purity argon gas with a purity of more than 99.99% is used for coaxial protection with the welding torch, and the protective gas flow rate is 20-25 L/min.

The above-mentioned automatic MIG welding method for aluminum alloy thick plate chamber with high sealing performance is characterized in that: when welding the internal welding seam of the chamber, the angle between the welding torch and the aluminum alloy plates on both sides of the welding seam currently being welded is 45 mm. °.

Embodiment 1

A high-sealing aluminum alloy rectangular chamber plasma arc-laser hybrid welding method, the method comprises the following steps:

The first step is to first clamp the No. 1 plate 1, No. 3 plate 3, No. 4 plate 4, No. 5 plate 5, No. 6 plate 6 into a rectangular chamber, and reserve No. 2 plate 2 for the time being. Assemble the chamber. The notch on the side where the second plate 2 is not installed is placed horizontally upward, so that the four inner welding seams of the first plate 1 and the third plate 3, the fourth plate 4, the fifth plate 5 and the sixth plate 6 are in a horizontal state, extend the welding torch from the chamber gap of the second plate 2, and use the optimized welding process parameters to weld the inner parts of the first plate 1 and the third plate 3, the fourth plate 4, the fifth plate 5, and the sixth plate 6. four welds;

The second step is to keep the posture of the chamber unchanged, cover the No. 2 plate 2, and use the optimized welding process parameters to weld the two outer welding seams of the No. 2 plate 2, the No. 5 plate 5, and the No. 6 plate 6;

The third step is to invert the chamber, place the second plate 2 at the bottom, and the side of the rectangular annular gap on the first plate 1 to face up, so that the second plate 2 and the third plate 3, the fourth plate 4, and the fifth plate 5, The four welding seams on the inner side of the lap joint of the No. 6 plate 6 are all in a horizontal state, and the welding torch is extended from the rectangular annular gap of the No. 1 plate 1, and the No. 2 plate 2 and the No. 3 plate 3 and 4 are welded using the optimized welding process parameters. 4 welding seams on the inner side of the lap joint of No. 4, No. 5, and No. 6 plates;

The fourth step, adjust the chamber to the posture where the No. 6 plate 6 is placed at the bottom, and extend the welding torch from the rectangular annular gap of the No. 1 plate 1, and use the optimized welding process parameters to weld the No. 6 plate 6 and the No. 3 plate 3, Two welding seams inside the chamber where the fourth plate 4 is lapped;

Step 5. Adjust the chamber to the posture where the No. 5 plate 5 is placed at the bottom, and extend the welding torch from the rectangular annular gap on the No. 1 plate 1, and use the optimized welding process parameters to weld the No. 5 plate 5 and the No. 3 plate 3, two welding seams inside the chamber where the fourth plate 4 is overlapped, and one outer welding seam of the chamber where the first plate 1 and the sixth plate 6 are overlapped;

Step 6: Adjust the chamber to the posture where the No. 6 plate 6 is placed at the bottom, and use the optimized welding process parameters to weld a weld on the outside of the chamber where the No. 1 plate 1 and the No. 5 plate 5 overlap;

Step 7: Adjust the chamber to the position where the third plate 3 is placed at the bottom, and use the optimized welding process parameters to weld the fourth plate 4 and the first plate 1, the second plate 2, the fifth plate 5, and the sixth plate 6. Four lapped outer welds of the chamber;

The eighth step, adjust the chamber to the posture where the fourth plate 4 is placed at the bottom, and use the optimized welding process parameters to weld the third plate 3 and the first plate 1, the second plate 2, the fifth plate 5, and the sixth plate 6. The four lapped outer welds of the chamber.

The optimized welding process parameters are:
(1) Arc starting current: 270-300 A;
(2) Welding current A: 210-240 A;
(3) Arc termination current: 190-200 A;
(4) Welding voltage: 18-20 V;
(5) Welding speed: 40-45 cm/min;
(6) The length of the welding wire extending from the welding gun: 13-15 mm;
(7) Arc termination delay time: 0.4-0.6 seconds;
(8) Laser power P: satisfy P+A=350;
(9) Laser beam position: 2 mm to 5 mm in front of the plasma arc;
(10) The angle between the laser beam and the welding torch: 55°~45°.

All welds are welded in a horizontal position, and the left welding method is used. The angle between the welding torch and the welded section of the currently welded weld is 14°-25°.

In the above-mentioned high-sealing aluminum alloy thick plate chamber plasma arc-laser hybrid welding method, the optimized welding process parameters used are:
(1) Arc starting current: 270 A;
(2) Welding current A: 210 A;
(3) Arc termination current: 190 A;
(4) Arc termination delay time: 0.4 seconds;
(5) Welding voltage: 18 V;
(6) Welding speed: 40 cm/min;
(7) The length of the welding wire extending from the welding gun: 13 mm;
(8) Laser power P: 140 W;
(9) Laser beam position: 2 mm in front of the plasma arc;
(10) The angle between the laser beam and the welding torch: 55°

In the above-mentioned high-sealing aluminum alloy thick plate chamber plasma arc-laser hybrid welding method, all welds are welded in a horizontal position, and the left welding method is used, and the welding torch maintains an included angle with the welded section of the currently welded weld. 15°.

The welded seam samples are analyzed, and the welded seam is well formed, without pores, and the quality of the welded seam meets the GB\12469-1990 defect level 1 standard. After the chamber is welded, there is no obvious deformation as a whole. After the ultimate vacuum degree test, the vacuum degree of the chamber can reach 1 Pa, which meets the design requirements.

What is claimed is:

1. A plasma arc-laser hybrid welding method for a high-sealing aluminum alloy rectangular chamber, comprising steps of:
    step (1): first clamping and assembling a No. 1 plate, a No. 3 plate, a No. 4 plate, a No. 5 plate, and a No. 6 plate into a rectangular chamber, retaining a No. 2 plate for the time being, and temporarily installing the No. 2 plate in the chamber; using predetermined welding process parameters to weld four internal welding seams of the No. 1 plate to the No. 3 plate, the No. 4 plate, the No. 5 plate and No. 6 plate;
    step (2): keeping a posture of the chamber unchanged, covering the No. 2 plate, and using the optimized welding process parameters to weld two external welding seams of the No. 2 plate to the No. 5 plate and the No. 6 plate;
    step (3): turning the chamber upside down to place the No. 2 plate at the bottom, so that the No. 2 plate is overlapped with the No. 3 plate, the No. 4 plate, the No. 5 plate, and No. 6 plate, and four internal welding seams of the No. 2 plate are all in a horizontal state; using the predetermined welding process parameters to weld four internal welding seams of the No. 2 plate to the No. 3, No. 4, No. 5 and No. 6 plates;
    step (4): adjusting the chamber to a posture where the No. 6 plate is placed at the bottom, and using the predetermined welding process parameters to weld two internal welding seams of the No. 6 plate to the No. 3 and No. 4 plates;
    step (5): adjusting the chamber to a posture where the No. 5 plate is placed at the bottom, and using the predetermined welding process parameters to weld two internal welding seams of the No. 5 plate to the No. 3 plate and the No. 4 plate, as well as one external welding seam of the No. 1 plate to the No. 6 plate;
    step (6): adjusting the chamber to a posture where the No. 6 plate is placed at the bottom, and using the predetermined welding process parameters to weld one welding seam of the No. 1 plate to the No. 5 plate;
    step (7): adjusting the chamber to a posture where the No. 3 plate is placed at the bottom, and using the predetermined welding process parameters to weld four external welding seams of the No. 4 plate to the No. 1 plate, the No. 2 plate, the No. 5 plate and the No. 6 plate; and
    step (8): adjusting the chamber to a posture where the No. 4 plate is placed at the bottom, and using the predetermined welding process parameters to weld four external welding seams of the No. 3 plate to the No. 1 plate, the No. 2 plate, the No. 5 plate and the No. 6 plate.

2. The method according to claim 1, wherein the predetermined welding process parameters are:
    (1) arc starting current: 270-300 A;
    (2) welding current (A): 210-240 A;
    (3) arc termination current: 190-200 A;
    (4) welding voltage: 18-20 V;
    (5) welding speed: 40-45 cm/min;
    (6) length of the welding wire extending from the welding gun: 13-15 mm;
    (7) arc termination delay time: 0.4-0.6 seconds;
    (8) laser power (P): satisfy $|P|+|A|=350$, which means a value of the laser power plus a value of the welding current equals to 350, wherein a unit of the laser power is watt;
    (9) laser beam position: 2 mm to 5 mm in front of the plasma arc;
    (10) an angle between the laser beam and a welding torch: 55-45°.

3. The method according to claim 1, wherein all the welding seams are welded in a horizontal position, a left welding method is used, and an angle between a welding torch and a welded section of a currently weld seam is in a range of 14°-25°.

* * * * *